(12) United States Patent
Shamir et al.

(10) Patent No.: US 8,212,876 B2
(45) Date of Patent: Jul. 3, 2012

(54) SYNTHETIC COLOUR NIGHT VISION SYSTEM

(75) Inventors: Hanan Shamir, Haifa (IL); Yosi Yaeli, Haifa (IL); Ilan Efrat, Haifa (IL)

(73) Assignee: Elbit Systems Ltd., Haifa (IL)

( * ) Notice: Subject to any disclaimer, the term of this patent is extended or adjusted under 35 U.S.C. 154(b) by 1074 days.

(21) Appl. No.: 11/794,424

(22) PCT Filed: Dec. 19, 2005

(86) PCT No.: PCT/IL2005/001359
§ 371 (c)(1),
(2), (4) Date: Feb. 26, 2008

(87) PCT Pub. No.: WO2006/070351
PCT Pub. Date: Jul. 6, 2006

(65) Prior Publication Data
US 2008/0157000 A1 Jul. 3, 2008

(30) Foreign Application Priority Data

Dec. 29, 2004 (IL) .......................................... 166042

(51) Int. Cl.
*H04N 5/30* (2006.01)
(52) U.S. Cl. ........................ 348/162; 348/164; 348/167
(58) Field of Classification Search .................. 348/162, 348/164, 167
See application file for complete search history.

(56) References Cited

U.S. PATENT DOCUMENTS

| | | | |
|---|---|---|---|
| 5,162,647 A | 11/1992 | Field, Jr. | |
| H1599 H * | 10/1996 | Task et al. | 348/33 |
| 5,756,989 A * | 5/1998 | Bear et al. | 250/214 VT |
| 6,215,597 B1 | 4/2001 | Duncan et al. | |
| 6,570,147 B2 * | 5/2003 | Smith | 250/214 VT |
| 7,732,769 B2 * | 6/2010 | Snider et al. | 250/336.1 |
| 2002/0067560 A1 | 6/2002 | Jones et al. | |
| 2002/0175268 A1 * | 11/2002 | Smith | 250/208.1 |
| 2011/0151575 A1 * | 6/2011 | Fraser et al. | 436/155 |

FOREIGN PATENT DOCUMENTS

| WO | WO 2004/064391 | 7/2004 |
|---|---|---|
| WO | WO 2006/070351 | 7/2006 |

OTHER PUBLICATIONS

Waxman et al., "Solid-State Color Night Vision: Fusion of Low-Light Visible and Thermal Infrared Imagery", Lincoln Laboratory Journal, vol. 11, No. 1, 1998, pp. 41-60.

Toet, "Color the Night: Applying Daytime Colors to Nighttime Imagery", Proceedings of the SPIE—The International Society for Optical Engineering SPIE-INT. Soc. Opt. Eng USA, vol. 5081, No. 1, 2003, pp. 168-178.

(Continued)

*Primary Examiner* — Mohamed Wasel

(57) ABSTRACT

A night vision coloring system may color a scene by extracting the spectral signature of each area in a scene and matching the extracted signature with a predetermined database signature and associated color. The system may comprise a temporal or spatial filtering element that may typically allow the capturing of an image reflection through a plurality of spectral bands, thereby extracting the spectral signature of each area in the image. The color associated with the matched database signature may be used to color each area comprising the image.

19 Claims, 6 Drawing Sheets

OTHER PUBLICATIONS

Fay et al., "Fusion of Multi-Sensor Imagery for Night Vision: Color Visualization, Target Learning and Search", Proceedings of the Third International Conference on Information Fusion (Cat. No. 00EX438) Int. Soc. Inf. Fusion Sunnyvale, CA, USA, vol. 1, 2000, pp. TUD3/3-10.

International Search Report for PCT International Application No. PCT/IL2005/001359 mailed Mar. 23, 2006.

Brief Communication Dated Mar. 25, 2010 From the European Patent Office Re. Application No. 05817751.0.

Communication Pursuant to Article 94(3) EPC Dated Dec. 3, 2009 From the European Patent Office Re. Application No. 05817751.0.

Communication Pursuant to Article 94(3) EPC Dated May 19, 2009 From the European Patent Office Re. Application No. 05817751.0.

Communication Pursuant to Rules 109 and 110 EPC Dated Aug. 10, 2007 From the European Patent Office Re. Application No. 05817751.0.

International Preliminary Report on Patentability Dated Jul. 12, 2007 From the International Bureau of WIPO Re. Application No. PCT/IL2005/001359.

International Search Report and the Written Opinion Dated Mar. 23, 2006 From the International Searching Authority Re. Application No. PCT/IL2005/001359.

Response Dated Jun. 5, 2009 to Communication Pursuant to Article 94(3) EPC of May 19, 2009 From the European Patent Office Re. Application No. 05817751.0.

Response Dated Mar. 24, 2010 to Communication Pursuant to Article 94(3) EPC of Dec. 3, 2009 From the European Patent Office Re. Application No. 05817751.0.

Communication Pursuant to Article 94(3) EPC Dated Sep. 20, 2011 From the European Patent Office Re. Application No. 05817751.0.

Miller et al. "Integration of SIGSIM Real-Time Thermal and Athmospheric Modeling Library Into Paint the Night", Retrieved From the Internet, XP007919401, 8 P., Mar. 9, 2002.

Miller et al. "Integration of SIGSIM Real-Time Thermal and Atmospheric Modeling Library Into Paint the Night", JRM Technologies, XP007919395, Retrieved From the Internet, 14 P., Nov. 2, 2002.

Schultz et al. "Correlated Physics-Based Multisensor Simulation", SimTechT Simulation Technology and Training Conference, Sidney, Australia, Mar. 2, 2000, Retrieved From the Internet, 5 P., Mar. 2, 2000.

* cited by examiner

SYNTHETIC COLOUR NIGHT VISION SYSTEM

CROSS-REFERENCE TO RELATED APPLICATIONS

This application is a National Phase Application of PCT International Application No. PCT/IL2005/001359, entitled "SYNTHETIC COLOUR NIGHT VISION SYSTEM", International Filing Date Dec. 19, 2005, published on Jul. 6, 2006 as International Publication No. WO 2006/070351, which in turn claims priority from Israel Patent Application No. 166042, filed Dec. 29, 2004, both of which are incorporated herein by reference in their entirety.

BACKGROUND OF THE INVENTION

Conventional night vision systems, e.g. night vision goggles, use the reflected light from an object or scene by intensifying the image reflection and generating a monochrome image. The generated image is represented by monochromatic shades of intensity. More specifically, these types of systems use the image intensifier as an optical amplifier. Emitted photons, due to the illuminated image, that strike the entrance to the intensifier are converted to electrons by a photo-cathode. An electric field applied between the photo-cathode and Micro Channel Plate (MCP) accelerates the electrons. The electric field is also applied through the MCP itself. The electrons are accelerated through the MCP, which amplifies the number of incoming accelerated electrons that ultimately bombard monochrome phosphors on a phosphorous screen. The phosphorous screen converts the amplified electrons back to photons, thereby displaying an amplified image represented by green shades of intensity. An image sensor, e.g. CCD (Charged Coupled Device) or CMOS (Complimentary Metal Oxide Semiconductor) Imager, detects the amplified image and translates it into a monochrome video signal.

Methods for producing a color night vision system have been attempted. The paper entitled, "Fusion of Multi-Sensor Imagery for Night Vision: Color Visualization, Target Learning and Search" by Fay et al., provides a methodology for creating a color night vision image by combining the imagery from multiple sensors. Each sensor is associated with one specific frequency band, e.g. visible, SWIR (Short Wave Infra Red), LWIR (Long Wave Infra Red), and MWIR (Medium Wave Infra Red), that contains unique image information. There are two processing stages, included in the combination of the frequency band image information, that lead to the formation of color components, e.g. R (Red), G (Green), B (Blue), Y (Brightness), I (red-green contrast), Q (blue-yellow contrast), which comprise the final color image. Firstly, the image revealed from each sensor is registered, filtered from noise, and contrast enhanced. The second stage consists of contrast enhancement between the different images, thereby separating the complimentary information that each band contains while combining common information from the spectral bands. The final color image may be displayed when taking into account the combined information from all spectral bands.

Reference is made to U.S. Pat. No. 5,162,647 issued on Nov. 10, 1992 to R. J. Field, Jr. and entitled, "Color Image Intensifier Device Utilizing Color Input and Output Filters Being Offset By a Slight Phase Lag". The patent includes an image intensifier tube normally providing a monochrome output. There exist input and output color filters for filtering desired light frequencies. Using a time interval methodology, the input color filter filters out the desired color frequency from the incoming light to the tube. The monochrome tube output is filtered through the output color filter to produce the corresponding input color component. Another embodiment of the patent uses spatial color filters, for e.g. colored fiber optic cables or colored micro-lenses, in both the input and output of the image intensifier. This allows for desired colors to be filtered and displayed in adjacent pixels to produce a color image. In another embodiment of the patent, only an input color filter such as a filter wheel, a sequential filter, or micro-lenses is used. An imager, e.g. CCD, is coupled to the output of the image intensifier with each pixel corresponding to a distinct color. The adjacent pixels may be combined to form a color image.

Reference is further made to U.S. Pat. App. No. 20020175268 filed on May 22, 2001 to Arlynn Walter Smith and entitled, "Color Night Vision Apparatus". Each desired color, e.g. the three primary colors, has a specific image intensifier tube associated with it. The desired frequency from the low light image is input to each tube via a frequency splitter, thereby causing each tube to provide an intensified output of the desired frequency. The intensified output signals, associated with each tube, are combined to form a color image that is in fact the intensified low light input signal to each of the image intensifiers.

Known methodologies for producing a color night vision system depend on filtering the color frequencies in the white visible light. However, white light is lost during transmission through a filter. Typically, the Near InfraRed (NIR) portion of the spectrum is filtered out. This causes a brightness reduction of the low light input signal. Moreover, in the color systems described above, for each monochrome pixel there exist several pixels associated with it, e.g. three pixels for each primary color, one for each desired color. For pixels that are the same size as the monochrome pixel, the resolution of the colored image is diminished. Additionally, many of the aforementioned methods include the use of white phosphors that do not maintain the same brightness as monochrome phosphors. Brightness reduction and diminished resolution lead to a mediocre night vision color image.

Furthermore, using multiple image intensifying components or sensors, as described above, increases the size of the color night vision system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
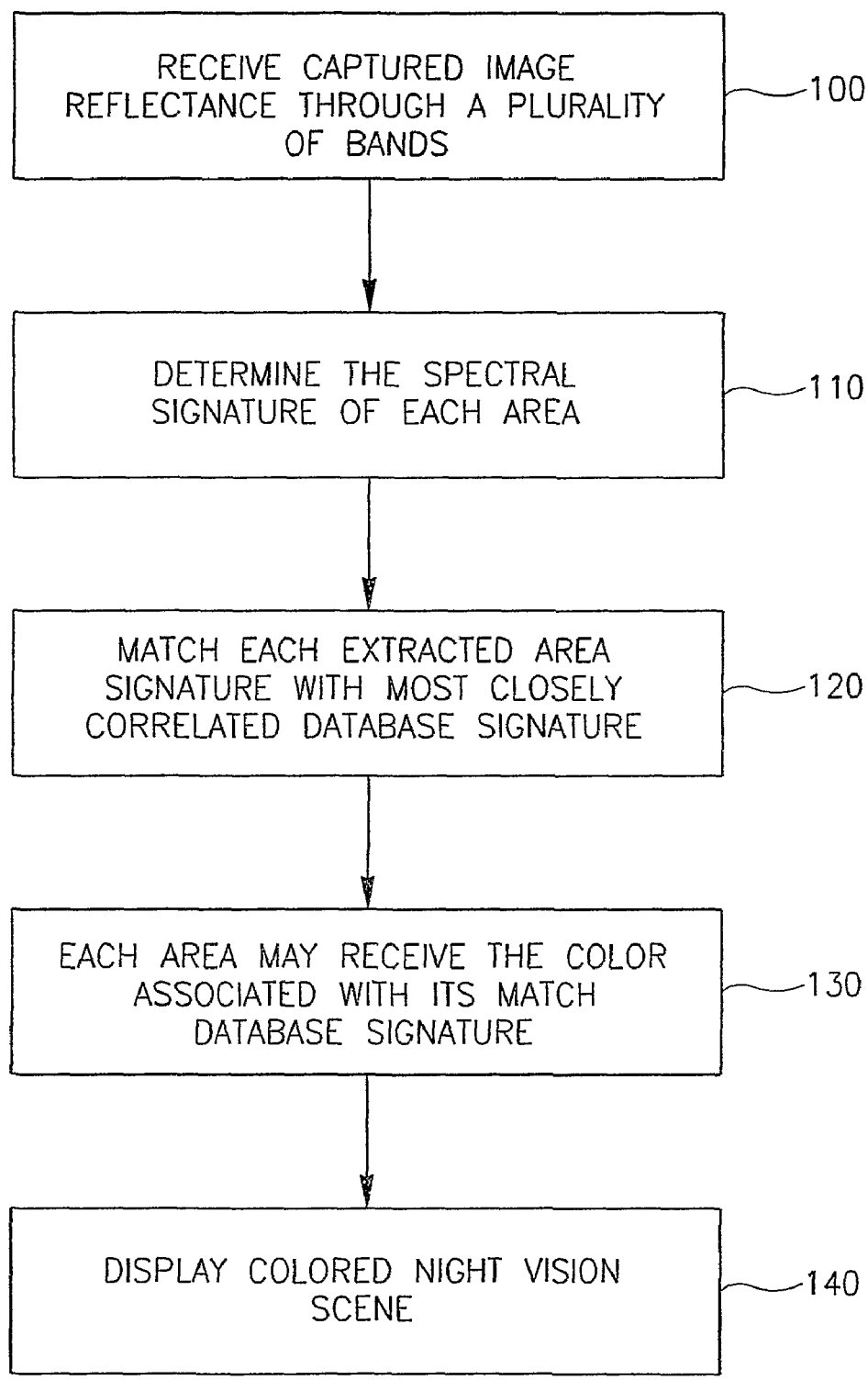
FIG. 1 depicts a flowchart for a method providing color to a night vision system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method according to an embodiment, shown in FIG. 1, may comprise the determination of the spectral signature of each area in an intensified image reflection (block 110). The spectral signature may be determined by the captured image reflectance through a plurality of bands (block 100). A computer processor may typically match the extracted spectral signature of each area in the intensified reflected image with the most closely correlated database signature (block 120). Each area may receive the color associated with its matched database signature (block 130), thereby allowing the display of a night vision scene in color (block 140).

Some systems for performing the method of the present invention are described below. It may be understood that any of the systems or features described herein may be used alone or in combination with each other to implement the aforementioned method.

Figure 2:
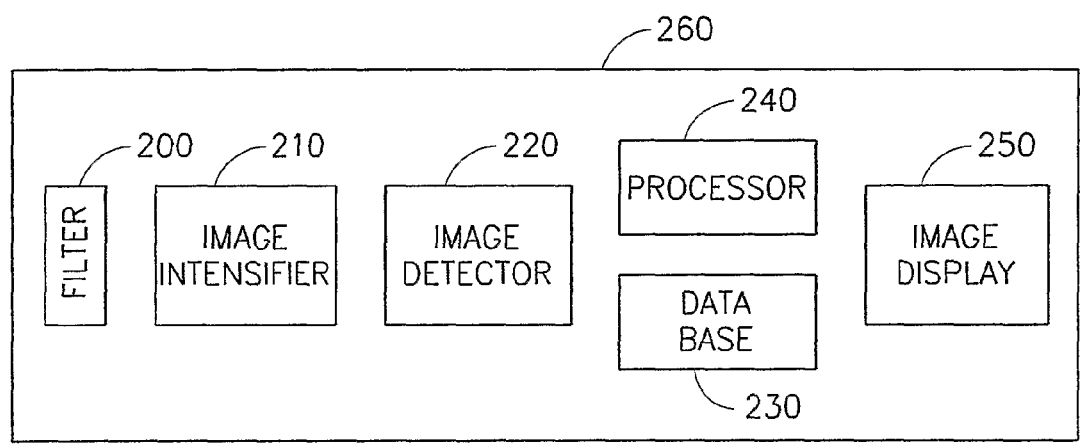
FIG. 2 is a bock diagram of a color night vision system in accordance with exemplary embodiments of the invention.

A color night vision system 260, depicted in FIG. 2, may extract spectral signatures of a scene or portions thereof and process the signatures in a predetermined database 240 of spectral signatures and associated colors, in order to display a colored image. The system 260 may contain a spectral band filtering element 200, an image intensifier 220, an image detector 220, a database of common spectral signatures 230, a processor 240, and an image display 250. The filtering element 200 may be used to extract the spectral signatures of each area in an image for example, for each pixel or group of pixels. The reflectance percentages for each of a plurality of wavelengths typically define the spectral signature of a material; such wavelengths may be outside the visible spectrum, e.g. Ultra Violet (UV), VIS, Near Infrared (NIR), (Medium Wave Infrared) MWIR, Infrared, or may be at least partially within visible spectrum. The reflectance percentage for each wavelength defines the spectral component while a plurality of spectral components typically defines the spectral signature. The filtering element 200 may include a temporal or spatial filtering mechanism to divide the reflected light into spectral components, for example, by sequentially filtering the reflected image through a plurality of bands or by simultaneously spatially dividing an image into a plurality of different bands.

Figure 3:
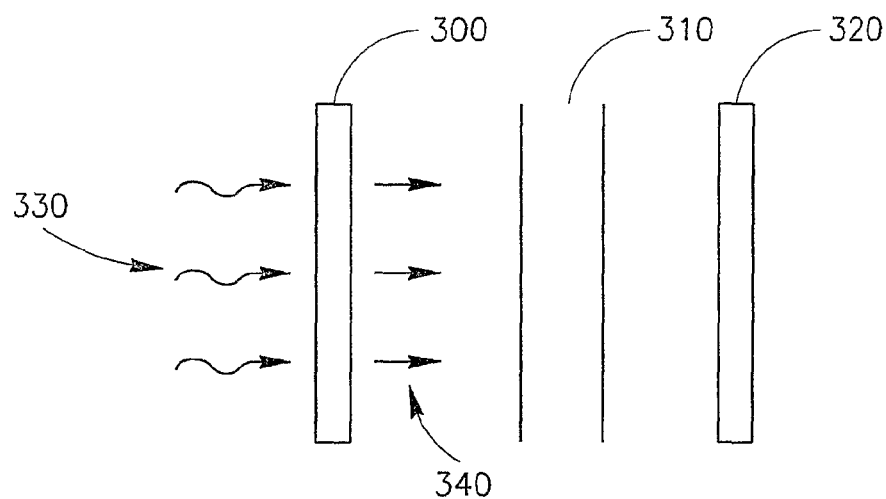
FIG. 3 is a schematic view of an image intensifier.

An image intensifier, shown in FIG. 3, may typically comprise a detecting element 300, micro channel plate (MCP) 310, and a phosphor screen 320. The detecting element 300, e.g. photocathode, EBAPS (Electron Bombarded Active Pixel Sensor) photocathode, Low-light Level CCD, InGaAs, or any other imaging detector, may convert the photons 330 received from the low light level illuminated image to electrons 340. Electrons 340 may be accelerated through an applied electric field, toward a micro channel plate (MCP) 310. The MCP 310 may typically multiply the electrons 340 via an electric field applied between its two plates. The multiplied electrons may typically collide into a phosphor screen 320 causing the emission of a pattern of bright spots that may correlate to an intensified version of the input image of the detecting element.

An image detector 220, e.g. CCD (Charged Coupled Device) or CMOS (Complimentary Metal Oxide Semiconductor) Imager, may capture each intensified image and send the image information to a processor 230. The processor 230 may typically receive a sequence of spectral images over time or spectral duplications of images associated with each of the plurality of spectral bands. The processor 230 may extract the signature of each pixel in the intensified image, due to the sampling of the image through a plurality of bands. The signature may be matched to at least one signature contained in a database 240 of predetermined spectral signatures. Each signature in the database 240 may have a color associated with it that may typically be used by the processor 230 to generate a color image of the captured scene to be displayed on an image display 250. An image display 250 may include, for example an Organic Light Emitting Diode (OLED), color Cathode Ray Tube (CRT), color Thin Film Transistor Liquid Crystal Display (TFT LCD), or any suitable display.

The formation of a database 240 of predetermined signatures may include capturing the reflection of a common material through several spectral bands and extracting its spectral signature. A user may store a desired color to be associated with the specific spectral signature of the material. This may typically be repeated for a plurality of common materials. An additional embodiment of a signature database 240 may comprise capturing the reflection of several materials having identical color, through a plurality of spectral bands, and determining the spectral signature of each material. The statistical average of the spectral signatures pertaining to the same color may be determined, thereby extracting the spectral signature of a color in the visible spectrum. Each spectral signature and associated color may be stored in the database 240. This may typically be repeated for a plurality of colors in the visible spectrum.

Figure 4:
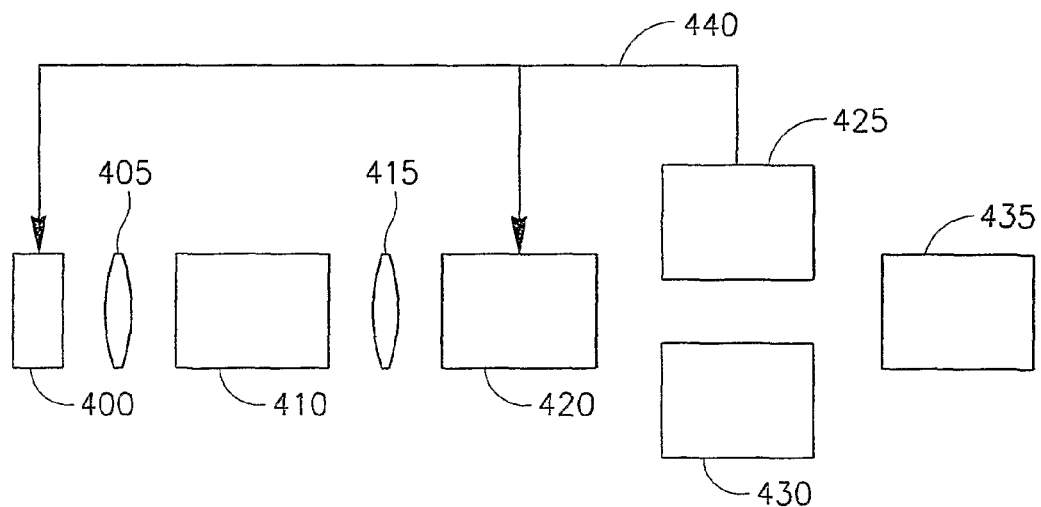
FIG. 4 is a schematic view of a color night vision system including a temporal spectral filter according to an embodiment of the invention.

An embodiment of the invention, shown in FIG. 4, may comprise a color night vision system using a spectral divider 400 that may typically be located in front of the image intensifier 410. The spectral divider 400 may be a mechanical switching mechanism, e.g. a rotary wheel, comprising a plurality of filters. Each one of the pluralities of filters may be used to select the desired spectral band from the reflected light from the scene. An objective 405, typically positioned between the spectral divider 400 and the intensifier 410, may be used to image the incoming filtered light onto the photocathode 300. The image intensifier 410 may project the intensified image to an optical relay 415, typically located at the output of the intensifier 410. The optical relay 415 may transfer the image to an imaging detector 420. The imaging detector 420 may typically send the image information to a processor 425 that may store the information prior to or during triggering 440 the spectral divider 400 and the imaging detector 420 in order to acquire a subsequent spectral image. The synchronized triggering 440 may cause the spectral divider 400 to switch to another spectral band while adjusting the exposure period of the imaging detector 420, thereby providing the ability to capture another intensified image through another spectral band. The processor 425 may therefore capture a sequence of images associated with each spectral band. The processor 425 may typically process the reflection information of each pixel in the sequence of images and typically extract its spectral signature. The processing unit 425 may search a database 430 of spectral signatures, typically to match each extracted signature with the most closely correlated database signature. Each signature in the database 430 may have a color associated with it that may typically be used by the processor 425 to generate a color image of the captured scene.

An alternate embodiment may include a spectral divider comprising an electrical switching mechanism typically replacing the mechanical switching mechanism, e.g. rotary wheel. The spectral divider may include a solid state device, for example, a semiconductor material. In accordance with the Stark and Zeeman effects, for an applied field, a solid state device may have an atomic spectral line associated with it. A spectral line may typically be a dark or bright line in an otherwise uniform and continuous spectrum, resulting from an excess or deficiency of photons in a narrow frequency band, compared with the nearby frequencies. The solid state device may be used to sequentially filter the reflected image through a plurality of bands by sequentially applying a plurality of electrical or magnetic fields across the device. The applied electric field across a semiconductor device may change the energy band gap of the material, thereby varying the wavelengths that may be absorbed by the material.

Figure 5A:
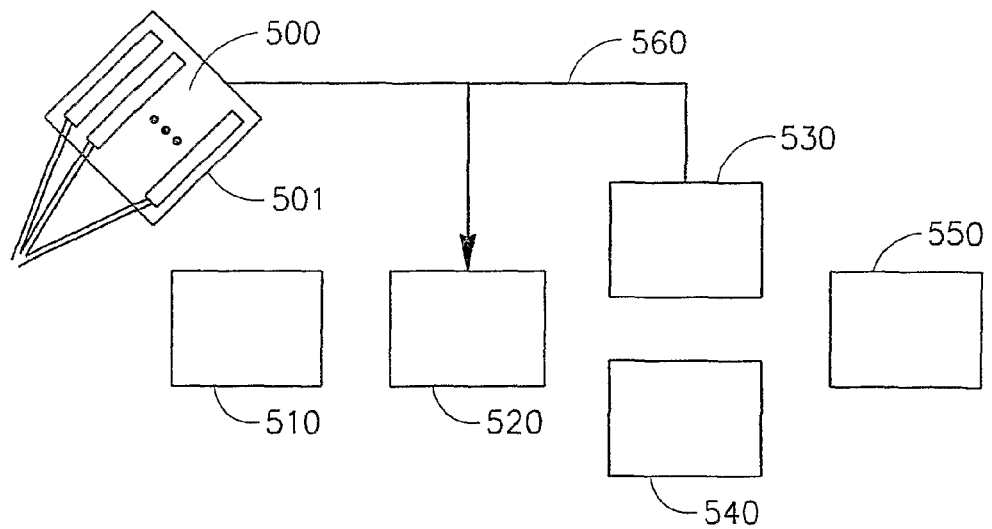
FIG. 5A is a schematic view of a color night vision system including a temporal spectral filter according to an embodiment of the invention.

A further embodiment of the invention, shown in FIG. 5A, may comprise a light source 501 having a plurality of illuminators 500 that may be operated sequentially, with distinct spectral bands, to determine the spectral signature of a pixel in a scene. This may typically replace the spectral divider 400. Each image captured by the image detector 520 may correspond to a distinct spectral band that may have typically been generated by the activated illuminator 500. The image detector may transfer the image reflection information, associated with each illuminator 500, to the processing unit 530 which may transmit a trigger 560 to the image detector 520 and the light source 501 having the plurality of illuminators 500. The processor 530 may typically process the pixel reflection information of the sequence of images and typically extract the spectral signature of each pixel in the scene. The processing unit 530 may process the spectral signatures through a predetermined database 540 of spectral signatures and associated colors, typically to project a color image of the captured scene onto an image display 550.

Figure 5B:
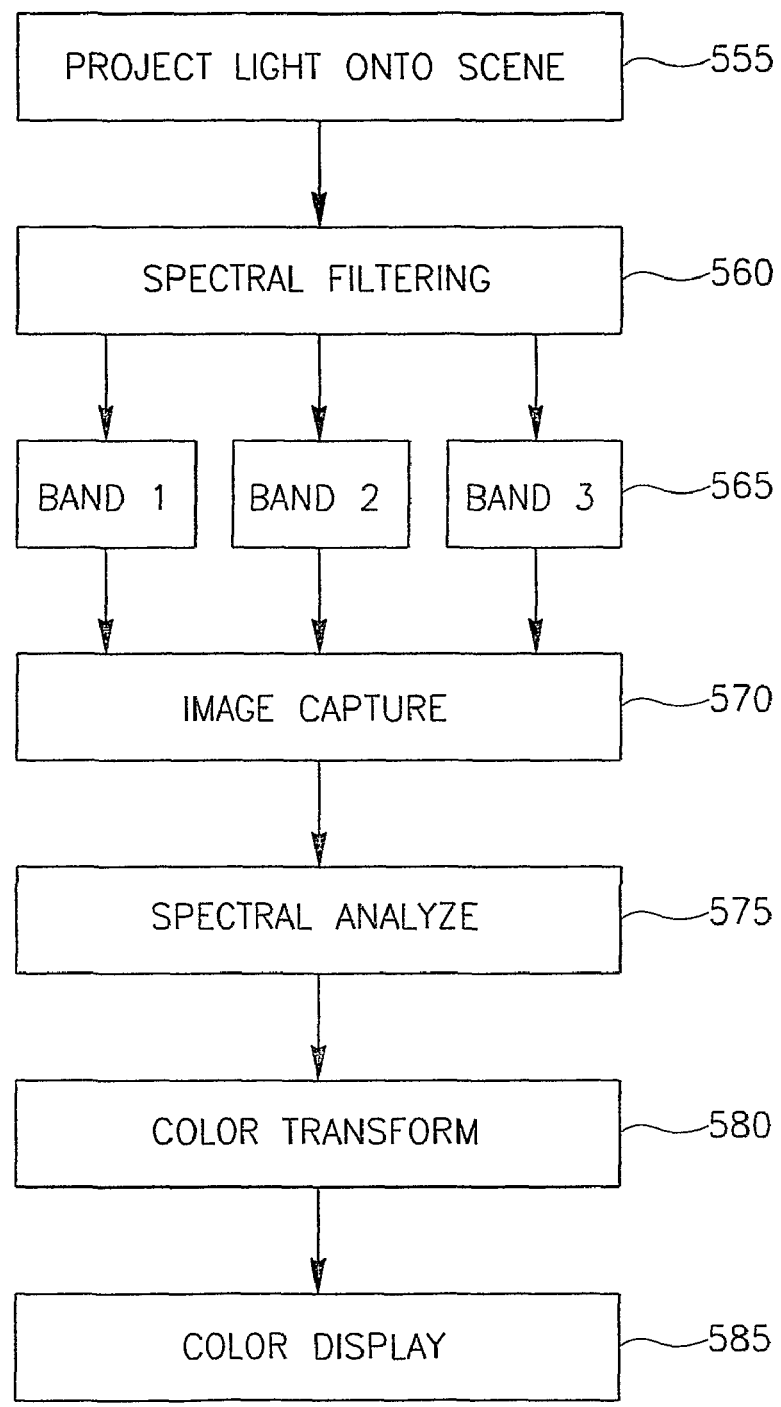
FIG. 5B depicts a flowchart for a method providing color to a night vision system according to an embodiment of the present invention.

A method of some embodiments of the present invention, shown in FIG. 5B, may project light onto a desired scene (block 555). The reflected light from the scene may possibly undergo spectral filtering (block 560) through one or more spectral bands (block 565). An image of the scene may be captured through each of the spectral bands (block 570). The spectral signatures for each portion of the scene may be determined based on the spectral components obtained from each of the spectrally filtered images (block 575). Each spectral signature may be associated with a visible color. The viewed scene may be transformed into a colored scene by coloring the viewed scene according to the visible color associated with each spectral signature (block 580). The colored scene may be output onto an appropriate display screen (block 585).

Figure 6:
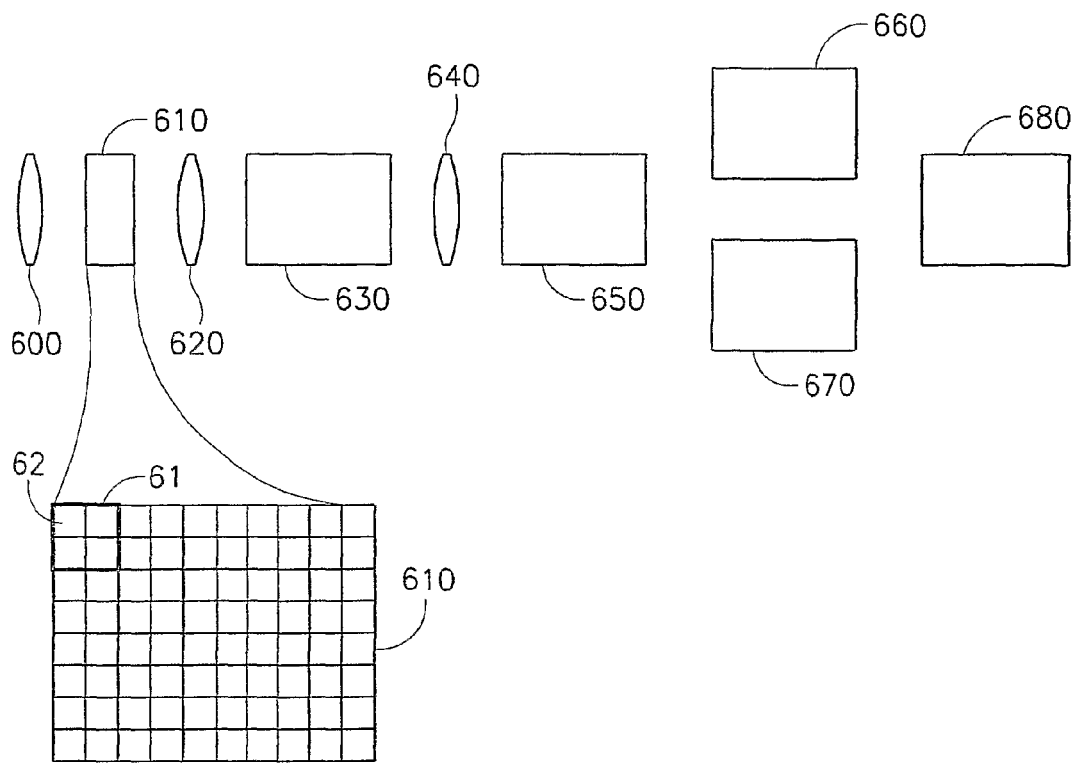
FIG. 6 is a schematic view of a color night vision system including a spatial spectral filter according to an embodiment of the invention.

Another embodiment of the invention, shown in FIG. 6, may include a spatial spectral filter 610 that may typically be located behind an objective 600 that may image the reflected light from the scene onto the spatial filter 610. The spatial spectral filter 610 may be coated on a glass window. The coating may comprise a plurality of spectral band coatings associated with a plurality of pixel nodes 62. Each pixel 61 may include several nodes 62. Each node 62 may typically be coated to filter a specific spectral band, thus typically performing spatial spectral extraction per node 62 of the reflected light from the scene. An optical relay lens may be 620 strategically positioned to project the spatially filtered image onto the photocathode of the image intensifier 630. An additional optical relay lens 640 may be positioned at the output of the image intensifier 630 to project the intensified spatially filtered image onto an image detector 650. A processing unit 660 that typically receives the intensified spatially filtered image may extract the reflection information associated with each node 62 and typically extract the spectral signature of each pixel 61 in the scene. The processing unit 660 may process the spectral signature through a predetermined database 670 of spectral signatures and associated colors, typically to project a color image of the captured scene onto an image display 670. An alternate embodiment may include a spatial filter embedded in the detecting plane of the image intensifier 630. This may typically eliminate the need for an optical relay lens 620 at the input to the image intensifier 630.

Figure 7:
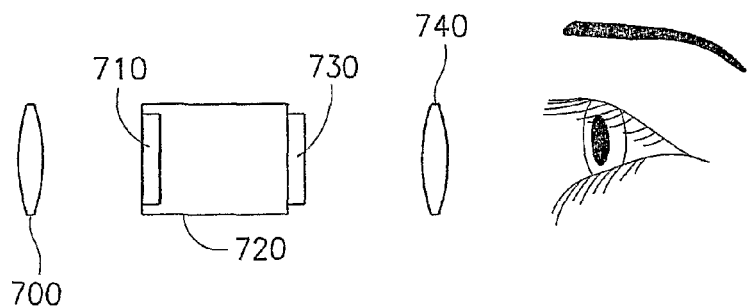
FIG. 7 is a schematic view of a direct view color night vision system including a spatial spectral filter according to an embodiment of the invention.

An additional embodiment of the invention, shown in FIG. 7, may comprise a spatial spectral filter 710 embedded in the detecting plane of the image intensifier 720. More specifically, the spatial spectral filter may be located between the entrance glass of the image intensifier and the photocathode 340. An objective 700 may typically image the scene onto the detecting plane. A white phosphor screen may be embedded in the image intensifier 720, thereby generating an intensified image with gray shades of intensity. An additional spatial spectral filter 730 may be coupled to the output of the image intensifier 720 and typically generate a color image of the scene, according to the phosphor intensity level. The output spatial spectral filter 730 may be aligned with the input spatial spectral filter 710, to the level of pixel nodes 62, where each output filter pixel node 62 may correspond to each input filter pixel node 62. Each pixel 61 comprising the output filter 730 may include Red, Green, and Blue (RGB) nodes 62. Each displayed color pixel 61 may typically be determined by the relative intensity of the reflected light passing through the RGB nodes 62 of the output filter 730. The definition and alignment of both input filter 710 and output filter 730 may define the coloring properties of the scene. An eyepiece lens 740 may project the colored scene onto a user's eye or eyes.

Figure 8A:
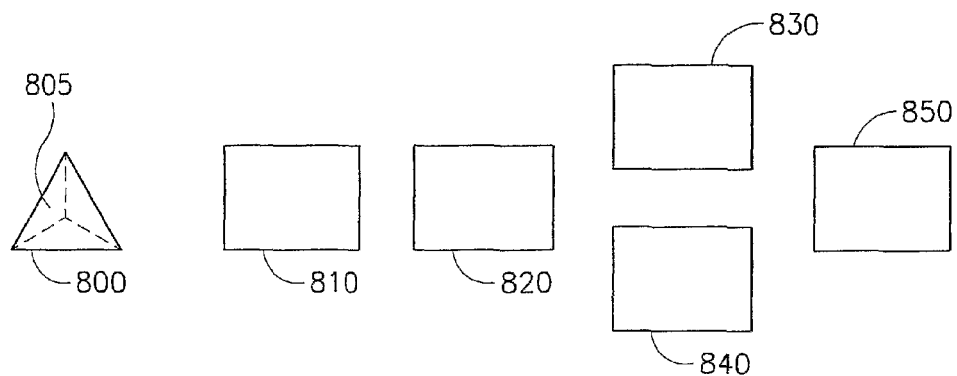
FIG. 8a. is a schematic view of a color night vision system including a spatial spectral filter according to an embodiment of the invention.
Figure 8B:
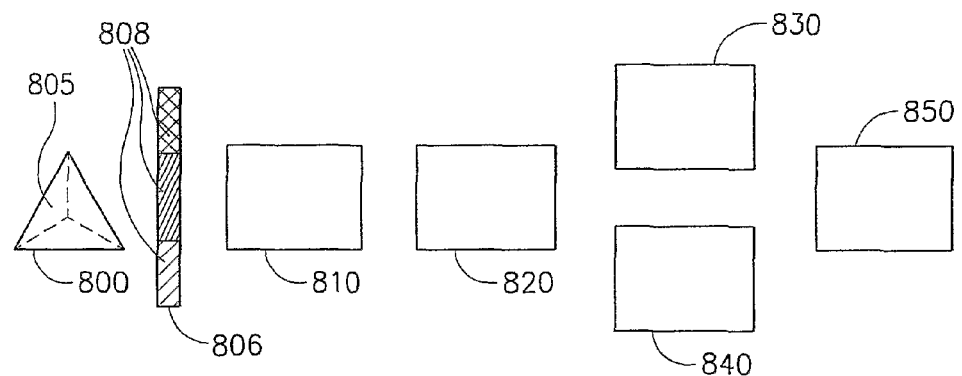
FIG. 8b. is a schematic view of a color night vision system including a spatial spectral filter according to a further embodiment of the invention.

A further embodiment, shown in FIG. 8, may comprise a prismatic filter 805 that may include a plurality of facets 805 that may be coated with a chromatic band filtering material. Each facet 805 may have a spectral band associated with it. Alternately, a glass window 806 typically located in front of the detecting element 300 may be coated with a plurality of band filtering material 808 to allow the imaging of each of the plurality of prism image reflections through one of the plurality of filter coatings 808. Each coating may therefore generate a spectral image. This may typically result in the spatial projection of a plurality of images associated with a plurality of spectral bands. The image detector 820 may receive the plurality of intensified filtered images and transmit to a processing unit 830. The processing unit 830 may extract the reflection information associated with each facet 805 or coated glass window and typically extract the spectral signature of each pixel 61 in the scene. The processing unit 830 may process the spectral signature through a database 840 of predetermined spectral signatures and associated colors, typically to project a color image of the captured scene onto an image display 850.

A white balance problem may occur due to the difference in external illumination conditions, e.g. starlight, moonlight, starlight/moonlight. Therefore, there may be differences between the signatures as stored in the database and the signatures observed by the device. An additional feature to the embodiments of the invention may be the adjustment of the database of spectral signatures according to the external illumination condition at the time of use of the system. Prior to use, the user may typically calibrate the night vision coloring system by imaging a known material through the device and extracting its spectral signature. The white balance offset may be determined by comparing the extracted signature of such a known material to the database signature. The calculated offset may typically be used to adjust the database signatures accordingly. An alternative or additional embodiment may adjust each extracted signature based on the determined offset without making any changes to the database.

Another configuration for incorporating the white balance offset may include the creation of a plurality of signature databases according to a plurality of illumination conditions. Each database of signatures may be associated with the illumination condition that was used when extracting each signature in the database. Based on the illumination condition at the time of use, the user or processor may typically choose the signature database that may be used during processing. Alternatively or additionally, in some embodiments of the invention a sensor may be external to the device and may communicate therewith, for example, the sensor may be embedded in a watch, Global Positioning System (GPS), or a device to detect and transmit the external illumination condition to the processor.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for producing a visual representation of the material of an object comprising:
    determining a spectral signature of the object in at least a portion of an input image, said spectral signature comprising a set of non-visible spectral components each being associated with a non-visible wavelength;
    comparing said spectral signature to each of a plurality of predetermined spectral signatures representing a respective plurality of materials and associated colors;
    based on said comparison, associating said spectral signature of said object with a material, thereby also associating said spectral signature with a respective color; and
    producing an output image having said color, thereby visually representing the material of said object as said color.

2. The method of claim 1, wherein said plurality of predetermined spectral signatures is stored in a database.

3. The method of claim 1, wherein said plurality of predetermined spectral signatures is stored in a plurality of databases, each corresponding to an external illumination parameter.

4. The method of claim 2, wherein data stored in said database is offset according to an external illumination parameter.

5. The method of claim 3, further comprising adjusting said spectral signature of said portion of said input image based on an external illumination parameter.

6. The method of claim 5, wherein said external illumination parameter is based on a comparison of a spectral signature or a reference object to a predetermined spectral signature of said reference object.

7. A system for producing a color image in nighttime or low light conditions, comprising:
    a filtering element for dividing a received input image into a plurality of spectral components;
    a database for storing a plurality of predetermined spectral signatures representing a respective plurality of materials and associated colors; and
    a processor for comparing said spectral components of said input image to each predetermined spectral signature of said database, and for producing a color image having colors associated with said predetermined spectral signatures that correspond to said spectral components of said input image.

8. The system of claim 7, wherein said input image is a non-visible input image, and wherein said filtering element concurrently divides said non-visible input image into spectral component.

9. The system of claim 7, wherein said input image is a non-visible input image, and wherein said filtering element sequentially divides said non-visible input image into spectral components.

10. The system of claim 8, wherein said filtering element includes a prism having a plurality of facets coated with band filtering material.

11. The system of claim 8, wherein said filtering element includes a window having a plurality of sections each coated with band filtering material and a dividing element to project a plurality of input images onto each said section of said window.

12. The system of claim 9, wherein said filtering element includes a mechanical switching mechanism including a plurality of band filters.

13. The system of claim 12, wherein said mechanical switching mechanism includes a rotary wheel.

14. The system of claim 9, wherein said filtering element includes a solid state device having a plurality of applied electrical fields across said solid state device.

15. The system of claim 9, wherein said filtering element includes a solid state device having a plurality of applied magnetic fields across said solid state device.

16. The system of claim 9, further comprising a lighting element capable of emitting illumination in a plurality of distinct spectral bands.

17. The system of claim 16, wherein said lighting element comprises a plurality of illuminators.

18. The system of claim 17, wherein said lighting element is capable of sequentially emitting illumination in said plurality of distinct spectral bands.

19. The system of claim 7, wherein said processor is capable of simultaneously triggering said filtering element and an image detector.

* * * * *